United States Patent [19]

Hinton et al.

[11] Patent Number: 4,751,378

[45] Date of Patent: Jun. 14, 1988

[54] OPTICAL DEVICE WITH QUANTUM WELL ABSORPTION

[75] Inventors: Harvard S. Hinton, Naperville; Anthony L. Lentine, St. Charles, both of Ill.; David A. B. Miller, Fairhaven, N.J.

[73] Assignee: American Telephone and Telegraph Company, AT&T Bell Laboratories, Murray Hill, N.J.

[21] Appl. No.: 42,202

[22] Filed: Apr. 24, 1987

[51] Int. Cl.[4] .............................................. H01J 40/14
[52] U.S. Cl. ............................. 250/211 J; 250/213 A; 377/102
[58] Field of Search ................ 250/211 R, 211 J, 578, 250/213 A; 365/109, 110, 112; 377/102; 357/30 R, 24 LR

[56] References Cited

U.S. PATENT DOCUMENTS

| | | | |
|---|---|---|---|
| 3,753,247 | 8/1973 | Rajchman | 365/112 |
| 4,166,224 | 8/1979 | Hutson | 357/30 |
| 4,546,244 | 10/1985 | Miller | 250/211 |
| 4,691,111 | 9/1987 | Bovino | 250/211 J |

OTHER PUBLICATIONS

D. A. B. Miller et al., "The Quantum Well Self-Electrooptic Effect Device: Optoelectronic Bistability and Oscillation, and Self-Linearized Modulation", *IEEE Journal of Quantum Electronics*, vol. QE-21, No. 9, Sep. 1985, pp. 1462-1476.

D. A. B. Miller et al., "Integrated Quantum Well Self-Electro-Optic Effect Device: 2X2 Array of Optically Bistable Switches", *Applied Physics Letters*, vol. 49, No. 13, Sep. 1986, pp. 821-823.

*Primary Examiner*—David C. Nelms
*Attorney, Agent, or Firm*—Richard J. Godlewski

[57] ABSTRACT

An optically bistable device 100 is disclosed having a self electro-optic effect device (SEED) 104 and a variable optical attenuator 103 for maintaining the state of the SEED over a wide power range of two input light beams. The SEED is responsive to the relative power levels of the two input light beams for assuming one of two states. The state of the SEED is determined by the transmission level of one of the beams passing through quantum well region 102 of the device. The variable optical attenuator concomitantly varies the power level of the two input beams to maintain the present state of the SEED over a wide range of input light beam powers. When operated in a bistable operating region of the device, a control light beam with a low power level changes the device from one state to another. Two threshold values of a ratio of power between the two input beams establish where the device switches from one state to the other.

20 Claims, 5 Drawing Sheets

OPTICAL DEVICE WITH QUANTUM WELL ABSORPTION

CROSS-REFERENCE TO RELATED APPLICATION

This application is related to the application Ser. No. 042,411 of H. S. Hinton, A. L. Lentine, and D. A. B. Miller, entitled "Symmetric Optical Device," filed Apr. 24, 1987.

TECHNICAL FIELD

This invention relates to nonlinear optical devices and particularly to those devices employing high gain or feedback resulting in multistable optical states or other nonlinear optical responses.

BACKGROUND OF THE INVENTION

A nonlinear or bistable optical device having a very low switching energy is described in U.S. Pat. No. 4,546,244 issued to David A. B. Miller on Oct. 8, 1985. This device has a semiconductor quantum well region which is electrically controlled to change its optical absorption and, in turn, the state of the device. A problem is that optical power must be continuously applied to the device to maintain its state. In one configuration, the device is operated with two input light beams. The power of one input light beam is maintained at a constant level and the power of the other light beam is varied to change the optical absorption and the state of the device. Removal of either beam before the other may cause the device to lose its present state.

Another problem associated with this bistable optical device is that once the power level of the constant power light beam is established, the power range of the variable light beam applied to the device for causing the device to change from one state to another is fixed.

SUMMARY OF THE INVENTION

The foregoing problems and disadvantages are solved and a technical advance is achieved in accordance with this invention by concomitantly varying the power of the two input light beams thereby advantageously maintaining the optical absorption of the device at a predetermined level without changing the state of the device. In one illustrative embodiment, a variable optical attenuator concomitantly varies the optical power of the input light beams. This permits the device to be operated with input beams having a wide range of power levels, and is particularly useful for operating the device as an optical latch or memory.

Another advantage of this device is that when the input light beams are concomitantly removed, the device retains its state for a predetermined period of time. As long as the input beams are concomitantly reapplied to the device within this time period, the device continues to retain the state that it had prior to removal of the beams. Furthermore, periodically refreshing the device with concomitantly applied input light beams maintains the state of the device while substantially reducing optical input power requirements.

When the two input light beams have been attenuated to a low power level, only a small increase in the power level of one of the two input light beams relative to the other advantageously causes the bistable device to change states. In particular, when a ratio of the power of one input light beam to the power of the other is greater than a first threshold value, the device switches from a first to a second state. When the power ratio is less than a second threshold value, the device switches from the second to the first state. Between the two threshold values, the device operates in its bistable region maintaining its state that it assumed prior to entering the bistable region.

Advantageously, by controlling the variable attenuator to increase concomitantly the power of the two input light beams to a high power level, one of which is emitted as an output beam having one of two transmission power levels, the state of an optically bistable device may be determined or read out at high power levels as well. Accordingly, the device, in effect, exhibits gain between the low power level of an input light beam required to change the state of the device versus the much higher power level of the subsequent output light beam.

In the illustrative embodiment, the optical device comprises a self electro-optic effect device (SEED) having a quantum well region and two photodiodes for electrically controlling the optical absorption of the quantum well region. The two photodiodes of the SEED are connected together in series for connection to a source of electrical potential. One of the two photodiodes includes the quantum well region in its intrinsic layer. The quantum well region has two levels of optical absorption representative of the two stable states of the device. When electrically connected in series to a source of electrical potential, the first and second photodiodes generate a photocurrent in response to first and second input light beams applied respectively thereto. Responsive to the photocurrent, the photodiodes electrically control the optical absorption of the quantum well region and, in turn, the state of the device. The optical device also includes a variable optical attenuator for concomitantly varying the power of the two input light beams for maintaining the optical absorption of the quantum well region at its present level and the state of the device at its present state.

Another advantage of this device is that as the light beams are concomitantly attenuated, the difference in power required between the light beams to change the optical absorption of the quantum well region and the stat of the device is reduced.

The optical device further comprises two optical combiners each for combining a bias and a control input light beam for application to one of the photodiodes. In one configuration of the device, the control beams function as set and reset signals for an optical S-R latch.

The attenuator further illustratively comprises a beam splitter for dividing a single light beam into the two bias input beams for the photodiodes.

DETAILED DESCRIPTION

Figure 1:
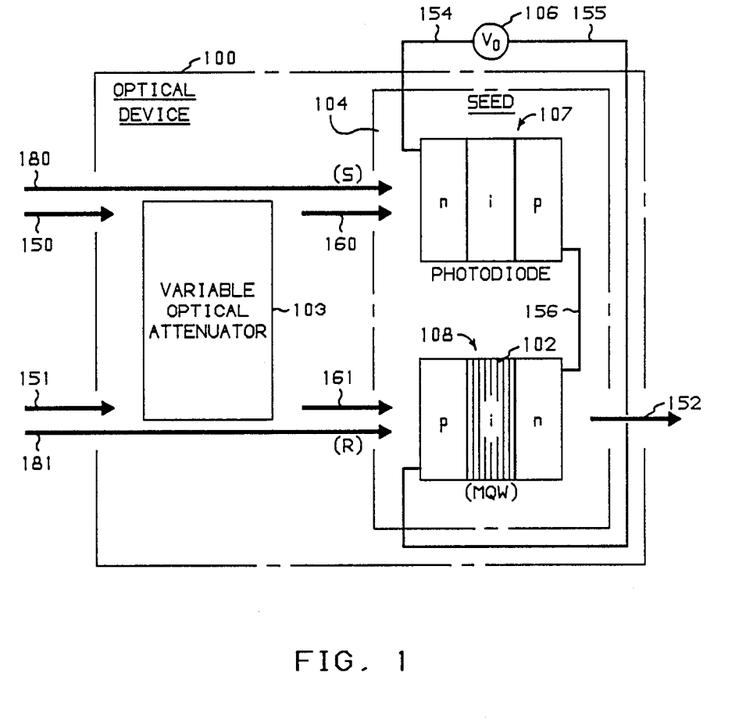
FIG. 1 depicts an illustrative bistable optical device 100 for storing binary information.

Depicted in FIG. 1 is an illustrative bistable optical device 100 for storing binary information represented by two different optical absorption levels of semiconductor multiple quantum region 102. Stored information is obtained from or read out of the device by passing a light beam 161 through semiconductor multiple quantum well region 102. The quantum well region has two different levels of optical absorption. One absorption level represents one of the two stable states of the device. The other absorption level represents the other state of the device. More particularly, the transmission level of output light beam 152 emitted from the region represents the state of the device and the level of the information stored therein. The transmission level of the output light beam decreases proportionally with the absorption level of the region. Significantly, the state of the device, as well as the information stored therein, is maintained at its present state or level as the power of input light beams 160 and 161 are concomitantly varied by variable optical attenuator 103. As used herein, concomitantly means substantially simultaneously light beams 150 and 151 are passed through attenuator 103 and emitted as light beams 160 and 161, respectively. When the power levels of light beams 160 and 161 have been attenuated to a low power level relative to respective light beams 150 and 151, only a small power increase in one of attenuated light beams 160 and 161 or the application of either low power level control light beams 180 or 181 switches the optical absorption from one level to another and correspondingly changes the state of the device along with the level of the information stored therein. Advantageously, light beams 160 and 180 need not be incident on the same area on photodiode 107, and light beams 160 and 181 need not be incident on the same area on photodiode 108. Attenuator 103 concomitantly increases the power level of light beams 160 and 161 to that of light beams 150 and 151 to obtain the state of the device or read out the stored information.

Optical device 100 comprises variable optical attenuator 103 and self electro-optic effect device (SEED) 104. Variable optical attenuator 103 is a well-known and commercially available unit such as an attenuator based on an optical polarizer, which may be controlled by rotation of the polarizer.

Self electro-optic effect device 104 is electrically connected to source of electric potential 106 via conductors 154 and 155 to form an electrical circuit for electrically controlling the optical absorption of semiconductor quantum well region 102 included therein. The self electro-optic effect device is described in an article by D. A. B. Miller et al., entitled "The Quantum Well Self Electro-Optic Effect Device; Optical Electronic Bistability and Oscillation, and Self Linearized Modulation", *IEEE Journal of Quantum Electronics*, Vol. QE-21, September, 1985 pages 1462-1476 and further described in an article by D. A. B. Miller et al, entitled "Integrated Quantum Well Self Electro-Optic Effect Device; 2×2 Array of Optically Bistable Switches", *Applied Physics Letters*, Vol. 49, September, 1986, pages 821-823. U.S. Pat. No. 4,546,244 describes how to make a self electro-optic effect device that will have two stable states. The article by J. S. Weiner et al., entitled "Low-Voltage Modulator and Self-Biased Self-Electro-Optic Effect Device", *Electronics Letters*, Vol. 23, Jan. 16, 1987, pages 75-77, describes how to make a SEED without any external source of electrical potential. Self electro-optic effect device 104 comprises two photodetectors 107 and 108 electrically interconnected via conductor 156. Photodetectors 107 and 108 are electrically connected in series with electric potential source 106 via conductors 154 and 155 as shown. Photodetector 107 is a well-known photodiode having n doped, intrinsic, and p doped layers. The intrinsic layer is optional in photodetector 107 as useful operation may be obtained without it. Photodetector 108 is a photodiode having p doped, intrinsic, and n doped layers, the n doped layer of photodiode 108 being electrically interconnected to the p doped layer of photodiode 107 via conductor 156. The intrinsic layer of photodiode 108 comprises semiconductor quantum well region 102. Source 106 is normally connected to reverse bias photodiodes 107 and 108. This requires that a positive voltage appear on the left side of source 106 relative to the right side of source 106 for the circuit as shown in FIG. 1. It is also possible to obtain useful characteristics from the device even when source 106 is omitted and replaced by a short circuit.

Figure 6:
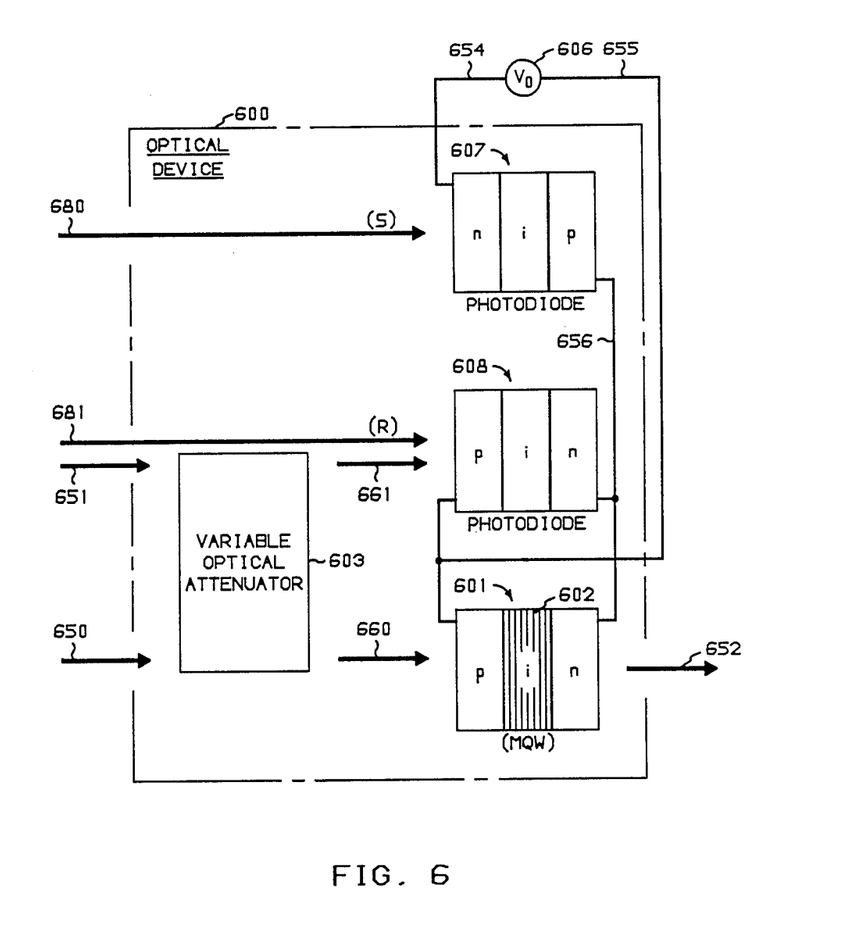
FIG. 6 depicts still another configuration of the optical device of FIG. 1.

In another configuration, the semiconductor quantum well region is included in an independent structure 101 such as a photodiode electrically connected in parallel across photodiode 108 as shown in FIG. 6. In this configuration, attenuator 603 variably attenuates bias input light beams 660 and 661 that are incident on photodiodes 601 and 608, respectively. Light beam 615 passes through quantum well region 602 and is emitted as light beam 652 to obtain the state of the device and the information stored therein. However, as shown in FIG. 1, the quantum well region has been included in photodiode 108.

Referring back to FIG. 1, photodiodes 107 and 108 are responsive to light beams 160 and 161, respectively, for generating a photocurrent in the electrical circuit formed by the two photodiodes and electric potential source 106. Photodiode 107 is responsive to the photocurrent for electrically controlling the optical absorption of semiconductor quantum well region 102 by controlling the voltage across the region. The optical absorption of the semiconductor quantum well region varies as a function of the voltage across the quantum well region.

Bistable self electro-optic effect device 104 changes from one state to the other by increasing the power of one of light beams 160 and 161 relative to the power of the other light beam. The optical absorption of the quantum well region, as well as the state of the device, is determined by the attenuation of a light beam passing through the quantum well region of photodiode 108. When the device is a high transmission level state, the optical absorption of the quantum well region is at a low level, thereby attenuating a light beam passing through photodiode 108 a small amount such as 3 db. When the device is a low transmission level state, the optical absorption of the quantum well region is at a high level, thereby attenuating a light beam passing through photodiode 108 a greater amount such as 6 db. The optical absorption of the quantum well region changes from a high to a low level when the ratio of power of the light incident on photodiode 107 relative to power of the light incident on photodiode 108 is greater than a first threshold value. Similarly, the optical absorption changes from a low to a high level when the power ratio is less than a second threshold value. For example, when the ratio of the power of light beam 160 to light beam 161 is greater than the first threshold value, the optical absorption of the quantum well changes from a high to a low level, and output light beam 152 assumes a high transmission level. Similarly, the optical absorption of the quantum well region changes from a low to a high level when the ratio of the power of light beam 160 to light beam 161 is less than the second threshold value. Hence, light beam 152 assumes a low transmission level. When the ratio of power of light beam 160 to light beam 161 is between the two threshold values, the device is in a bistable operating region where the device maintains its state prior to entering the region.

Figure 4:
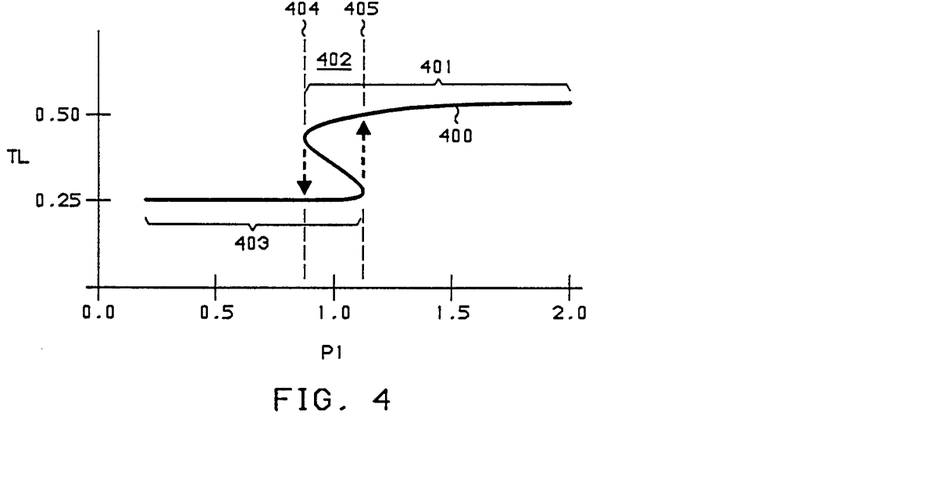
FIG. 4 depicts an illustrative transmission level curve of the optical device of FIG. 1.

Depicted in FIG. 4 is an illustrative curve 400 of the transmission level of quantum well region 102 as a function of the ratio (P1) of the power of input light beam 160 relative to the power of input light beam 161. The power of output light beam 152 divided by the power of input light beam 161 characterizes the transmission level (TL) of the quantum well region. As used here, a light beam represents the combined optical power incidence on a particular photodetector. Accordingly, a light beam may be the combination of one or more light beams. As previously indicated, the transmission level of the quantum well region, as well as that of the beam emitted therefrom, reduces in proportion to the optical absorption level of the quantum well region. Transmission level curve 400 has a high transmission level portion 401 and a low transmission level portion 403 that overlap in bistable operating region 402 of the graph between input power ratio P1 straight lines 404 and 405. In the bistable region of the device, a light beam emitted from the device in response to an input light beam having a given power level is at one of two possible stable power levels. Correspondingly, the optical absorption of the device in the bistable region is also at one of two possible levels. The operating history of the device determines which one of the two possible levels the device will assume in the bistable region. Assuming the transmission level of the quantum well region is initially at low transmission level 403, the transmission level of the quantum well region, as well as the state of the device, will change to a high level when the power ratio P1 of input light beam 160 to input light beam 161 is greater than the first threshold value indicated by line 405 somewhere between 1.0 and 1.5 of power ratio P1. This is indicated by the arrow on line 405 between transmission level 0.25 and 0.5. For sake of discussion, the switching threshold ratios indicated by lines 404 and 405 are approximately symmetric about ratio of 1. This is illustrative only. The actual ratios depend on the detailed design of the photodiodes, and need not be near 1. For example, when photodiode 107 has a low responsivity, switching threshold ratios indicated by lines 404 and 405 could both be at P1 ratios greater than 1.

Having assumed the high transmission level, the quantum well region maintains its high transmission level until the power ratio is less than a second threshold value indicated by straight line 404 somewhere between 0.5 and 1.0. This occurs when the power of light beam 160 is decreased to a level below that of light beam 161 which causes the quantum well region to change from a high to a low level of transmission. This is indicated by the arrow on line 404 between transmission level 0.25 and 0.5. In low transmission level region 403 of the curve, the optical absorption of the quantum well region is at a high level.

In bistable region 402 of the curve, the transmission level of the quantum well region remains at the transmission level prior to entering the bistable region. For example, when the quantum well region is at a high transmission level, it will remain in the high transmission level while in the bistable region. As the power of light beam 160 is decreased or light beam 161 is increased, the power ratio will decrease until it reaches the second threshold value indicated by line 404. Below the second threshold value, the quantum well switches from a high to a low transmission level. Similarly, when the transmission level of the quantum well is low, the quantum well region will remain at a low transmission until the ratio is greater than the first threshold value indicated by line 405.

When operating optical device 100 as an optical latch or memory, it is desirable to operate the device in the bistable region of its transmission level curve. As a result, a small power increase in one of the two input beams or the application of an additional control beam with a low power level is sufficient to cause the device to switch from one state to the other. For example, when input beams 150 and 151 are significantly attenuated by attenuator 103 and emitted as respective light beams 160 and 161, the application of control light beam 180 at a low power level to photodiode 107 causes the first threshold value of the power ratio to be exceeded. As a result, the quantum well changes from low transmission level 403 to high transmission level 401. Similarly, the application of control light beam 181 to photodiode 108 when the device is in the high transmission level and in bistable operating region 402 causes the power ratio to be reduced to less than the second threshold level. Resultingly, the quantum well changes from a high to a low transmission level.

In this exemplary mode of operation as an optical latch or a memory, the power level of light beams 150 and 151 are equivalent so that device 100 remains in the bistable operating region. Optical attenuator 103 concomitantly varies the power of light beams 150 and 151 so that emitted light beams 160 and 161 are attenuated by substantially equal fractions. Self electro-optic effect device 104 remains in the same state over a substantial range of concomitantly varying power levels of light beams 160 and 161. As long as the power ratio of the two light beams remains between the first and second threshold values, device 100 will remain in its present state. Control beams 180 and 181 are treated as set (S) and reset (R) input signals to a S-R optical latch. Device 100 will also retain its state when light beams 160 and 161 have been completely attenuated for a limited period of time as would be the case if attenuator 103 was a shutter. Opening the shutter, device 100 would return to its state prior to the closing of the shutter. The state of an integrated SEED as described in the *Applied Physics Letters* reference can be successfully retained for periods of at least 10 seconds.

Figure 2:
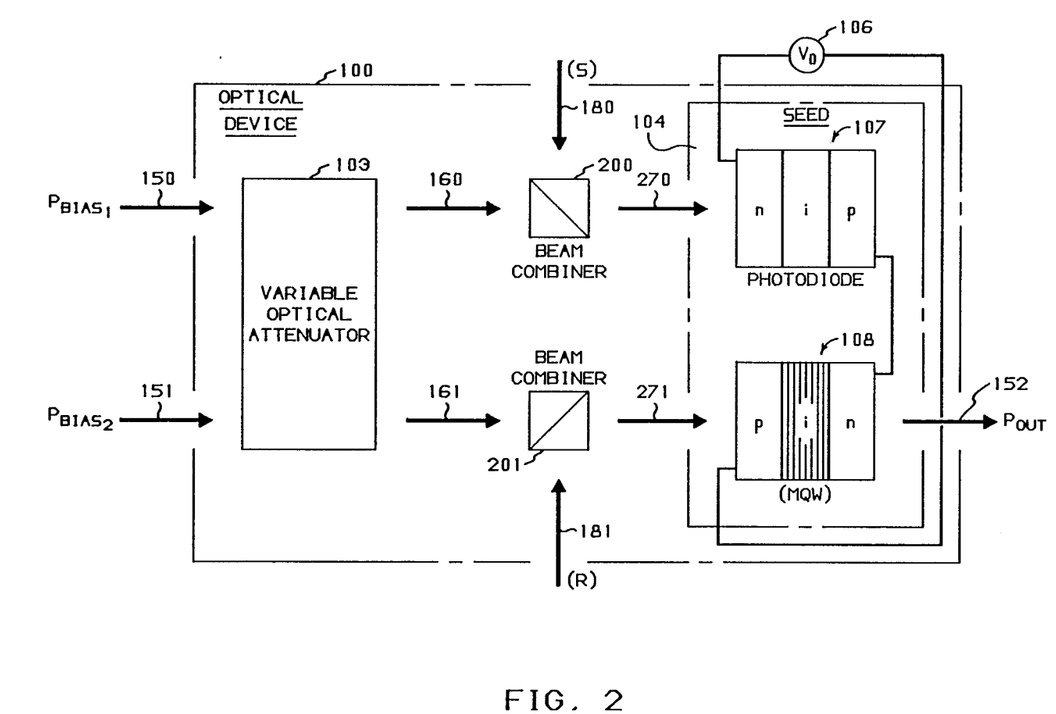
FIG. 2 depicts another configuration of the optical device of FIG. 1.

Another configuration of optical device 100 of FIG. 1 is shown in FIG. 2. In this configuration, light beams 160 and 161 from optical attenuator 103 are directed to optical combiners 200 and 201, respectively. These optical combiners are well-known and commercially available units. Control beams 180 and 181 are also applied to combiners 200 and 201, respectively. Optical combiner unit 200 combines bias light beam 160 and control beam 180 to form light beam 270 which has a power level equivalent to the sum of the power levels of light beams 160 and 180. Similarly, optical combiner 201 combines bias light beam 161 and control light beam 181 to form light beam 271 having a power level equivalent to the sum of the power levels of light beams 161 and 181. Light beams 270 and 271 are then applied to respective photodiodes 107 and 108 of the device 104 as previously described.

Figure 3:
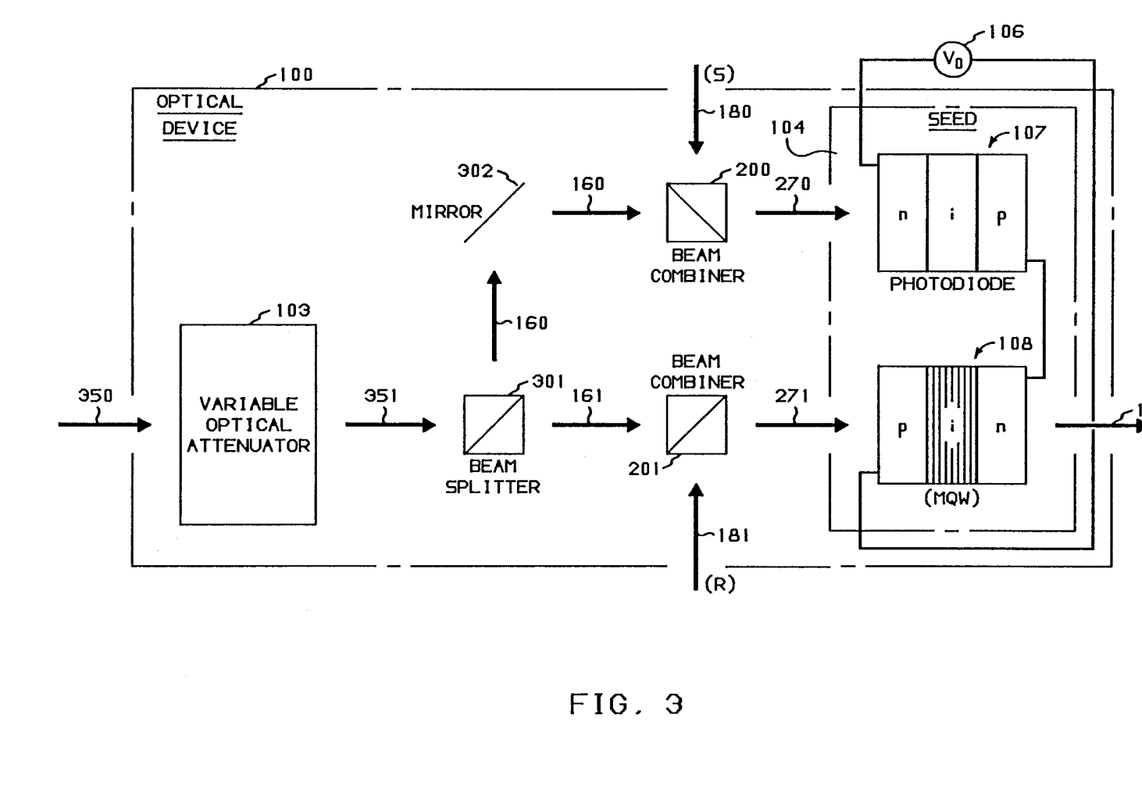
FIG. 3 depicts a modified version of the optical device of FIG. 2.

The configuration of optical device 100 as shown in FIG. 2 may be further modified as shown in FIG. 3. In this modified configuration, well-known beam splitter 301 and optical mirror 302 eliminate the need for two bias light beams being applied to optical attenuator 103. Here, optical attenuator 103 variably attenuates a single input light beam 350 and directs emitted light beam 351 to beam splitter 301. The beam splitter divides light beam 351 into light beams 160 and 161. The ratio of light beams 160 and 161 is chosen, by design of beam splitter 301, to be such as to put the device in its bistable region. Beam splitter 301 directly transmits light beam 161 to optical combiner 201 which combines the beam with control light beam 181 to form light beam 271. Beam splitter 301 also directs light beam 160 to optical combiner 200 via mirror 302. Optical combiner 200 combines light beams 160 and 180 to form light beam 270. In the device as shown in FIG. 3, photodiode 103 must be capable of generating photocurrent for light of the wavelength appropriate for operation of quantum well photodiode 108.

Figure 5:
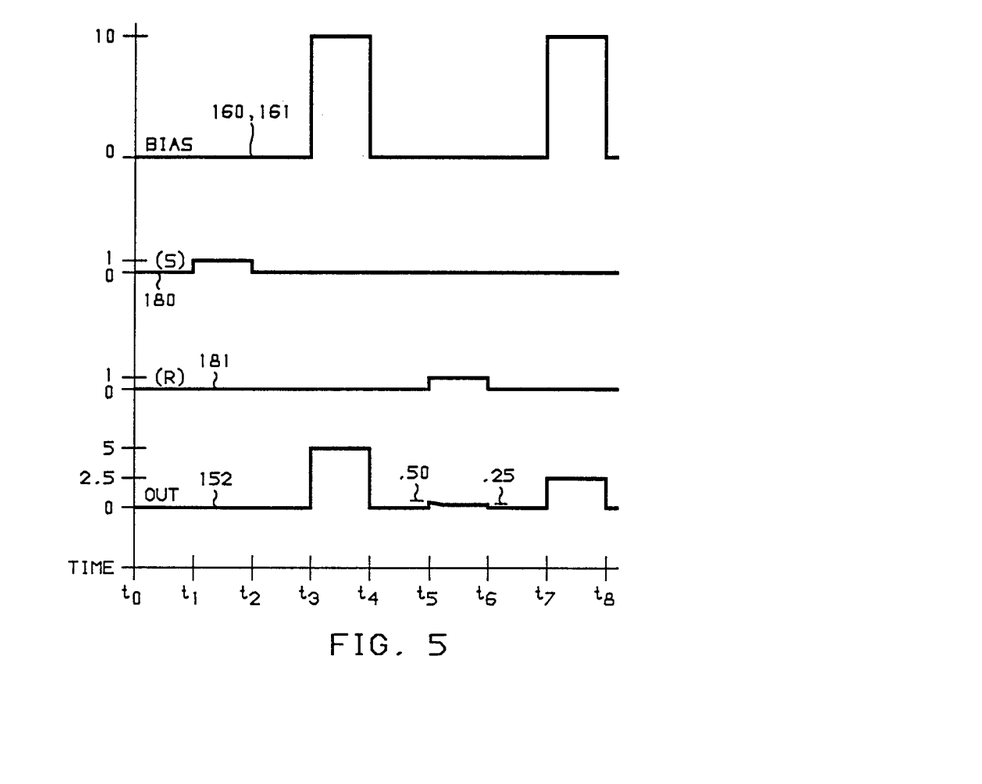
FIG. 5 is a timing diagram of the optical device of FIG. 1, operated as an optical S-R latch.

Depicted in the timing diagram of FIG. 5 is a graphical representation of idealized bias light beams 160 and 161, set (S) control beam 180, reset (R) control beam 181, and Q output light beam 152 of optical device 100 operated as an optical S-R latch, all plotted with respect to time. For simplicity, light beams 160 and 161 are shown as having equal powers, as is appropriate when ratio P1 equals 1 and lies within the bistable region of the device. When this is not the case, then an appropriate ratio within the bistable region must instead be chosen. As shown in FIG. 5, each of bias light beams 160 and 161 has two optical levels consisting of zero and ten units. Each of set and reset control light beams 180 and 181 has two power levels consisting of zero and one units. Q output light beam 152 emitted from photodiode 108 has power levels consisting of 0, 0.25, 0.5, 2.5, and 5.0.

At time t0, the power level of light beams 152, 160, 161, 180, and 181 are all at zero. During the period between times t1 and t2, set control beam 180 maintains a power level of one unit representative of a logic one. During the period between times t1 and t2, the optical absorption of quantum well region 102 assumes a low level, thereby allowing a subsequently applied light beam to be transmitted through the region at a high transmission level.

During the time period between times t2 and t3, all of the optical signals are again at a zero level. As previously discussed, the optical absorption of the quantum well region is maintained at a low level.

During the time interval between times t3 and t4, bias control beams 160 and 161 at a power level of ten are concomitantly applied to photodiodes 107 and 108, respectively. Since quantum well region 102 has a low level of optical absorption, the power of output light beam 152 changes from zero to five and maintains this high transmission level until time t4 when bias light beams 160 and 161 and output light beam 152 again assume a zero power level. All light beams remain at a zero power level between times t4 and t5.

During the time period between times t5 and t6, reset control beam 181 assumes and maintains a power level of one unit. Responding, the optical absorption of quantum well region 102 assumes a high level, and output light beam 152 rapidly changes from a power level of 0.5 to 0.25 units.

Between times t6 and t7, all the light beams assume a zero power level. During the period between times t7 and t8, the state of the latch is obtained or read out by once again applying bias light beams 160 and 161 at power level of ten units. Since the optical absorption of the quantum well is at a high level, output light beam 152 is significantly attenuated having only a power level of 2.5 representative of low transmission level or a zero logic level. After time t7, all the light beams assume a zero power level.

It is to be understood that the above-described optical device is merely an illustrative embodiment of the principles of this invention and that numerous other optical devices may be devised by those skilled in the art without departing from the scope of the invention. In particular, one skilled in the art may develop a number of other optical memory devices using the above-described technique.

What is claimed is:

1. An optical device comprising:
    means responsive to first and second light beams for electrically controlling an optical absorption of a semiconductor quantum well region; and
    means for concomitantly varying said first and second light beams for maintaining said optical absorption of said semiconductor quantum well region at a predetermined level.

2. The device of claim 1 further comprising a structure having said semiconductor quantum well region.

3. The device of claim 1 wherein said means responsive to first and second light beams includes said semiconductor quantum well region.

4. An optical device comprising:
    a semiconductor quantum well region having optical absorption;
    first and second means responsive to first and second light beams, respectively, for generating a photocurrent, at least one of said first and second means being responsive to said photocurrent for electrically controlling said optical absorption of said semiconductor quantum well region in order to cause said optical absorption of said semiconductor quantum well region to vary in response to variations in said photocurrent; and
    means for concomitantly varying said first and second light beams for maintaining said optical absorption of said semiconductor quantum well region at one of first and second predetermined levels.

5. The device of claim 4 wherein one of said first and second means comprises said semiconductor quantum well region.

6. The device of claim 5 wherein said means for concomitantly varying said first and second light beams includes beam splitter means for splitting a third light beam into said first and second light beams.

7. The device of claim 6 wherein said means for concomitantly varying said first and second light beams further includes director means for directing said first light beam from said beam splitter means to one of said first and second means.

8. The device of claim 4 wherein said first means is responsive to an increase in optical power of said first light beam for controlling said optical absorption of said semiconductor quantum well region to assume one of said first and second predetermined levels and wherein said device further comprises means for increasing the optical power of said first light beam.

9. The device of claim 8 wherein said second means is responsive to an increase in optical power of said second light beam for controlling said optical absorption of said semiconductor quantum well region to assume the other of said first and second predetermined levels and wherein said device further comprises means for increasing the optical power of said second light beam.

10. An optical device comprising;
first and second means responsive to first and second light beams, respectively, for generating a photocurrent, said first means being responsive to said photocurrent for electrically controlling an optical absorption of a semiconductor quantum well region in order to cause said optical absorption of said semiconductor quantum well region to vary in response to variations in said photocurrent; and
means for concomitantly varying said first and second light beams for maintaining said optical absorption of said semiconductor quantum well region at one of first and second predetermined levels.

11. The device of claim 10 wherein said means for concomitantly varying said first and second light beam includes beam splitter means for splitting a third light beam into said first and second light beams.

12. The device of claim 10 wherein said first means is responsive to an increase in optical power of said first control light beam for controlling said optical absorption of said semiconductor quantum well region to assume one of said first and second predetermined levels and wherein said device further comprises means for increasing the power of said first light beam.

13. The device of claim 10 wherein said second means is responsive to an increase in optical power of said second light beam for controlling said optical absorption of said semiconductor quantum well region to assume the other of said first and second levels and wherein said device further comprises means for increasing the power of said second light beam.

14. An optical device comprising:
a semiconductor quantum well region;
first and second means responsive to first and second light beams, respectively, for generating a photocurrent, at least one of said first and second means being responsive to said photocurrent for electrically controlling an optical absorption of said semiconductor quantum well region to vary in response to variations in said photocurrent; and
means for concomitantly varying said first and second beams to vary an absolute difference in power required between said first and second light beams to change said optical absorption of said semiconductor quantum well region from a first to a second predetermined level.

15. An optical device comprising:
a semiconductor multiple quantum well region having optical absorption;
means responsive to first and second light beams having optical power for electrically controlling said optical absorption of said semiconductor multiple quantum well region, said optical absorption assuming a first predetermined level when a ratio of power of said first relative to said second light beam is greater than a first predetermined value and assuming a second predetermined level when said ratio is less than a second predetermined value; and
means for concomitantly varying the power of said first and second light beams for maintaining said optical absorption of said semiconductor quantum well structure at the assumed one of said first and second predetermined levels.

16. An optical latch device comprising;
a first photodiode having an n doped semiconductor layer electrically connectable to a source of potential, an intrinsic semiconductor layer, and a p doped semiconductor layer;
a second photodiode having an n doped semiconductor layer electrically connected to said p doped semiconductor layer of said first photodiode, an intrinsic semiconductor layer having a semiconductor quantum well region having an optical absorption, and a p doped semiconductor layer connectable to said source of potential, said first and second photodiodes and said source of potential forming an electrical circuit;
said first and second photodiodes being responsive to first and second light beams, respectively, for generating a photocurrent in said electrical circuit, said first and second photodiodes being responsive to said photocurrent for electrically controlling said optical absorption of said semiconductor quantum well region to vary in response to variations in said photocurrent, said optical absorption assuming a first predetermined level when a ratio of power of said first relative to said second light beam is greater than a first predetermined value and assuming a second predetermined level when said ratio is less than a second predetermined value, said optical absorption being at one of said first and second levels when said ratio is between said first and second predetermined values;
first optical combiner means for combining a first bias light beam and a first control light beam to form said first light beam;
second optical combiner means for combining a second bias light beam and a second control light beam to form said second light beam;
an optical attenuator for concomitantly and proportionally varying said first and second bias light beams for maintaining said optical absorption of said semiconductor quantum well region at the assumed one of said first and second predetermined levels when said ratio is between said first and second predetermined values, said optical alternator being responsive to an electrical control signal for concomitantly and proportionally varying said first and second bias light beams to vary a difference in power required between said first and second control light beams to change said optical absorption of said semiconductor quantum well region from one to the other of said first and said second predetermined levels.

17. An optical device comprising:
means responsive to first and second light beams having optical power for electrically controlling an absorption of a semiconductor quantum well region, said optical absorption having a first predetermined level when a ratio of the power of said first relative to said second light beam is greater than a first predetermined value, a second predetermined level when said ratio is less than a second predetermined value, and either of said first and second levels when said ratio is between said first and second values;

means for concomitantly varying the power of first and second light beams for maintaining said optical absorption of said semiconductor quantum well region at the level that existed prior to commencement of concomitantly varying the power of said first and second light beams.

18. An optical memory device comprising first means having first and second states and responsive to first and second light beams for storing information represented by one of said first and second states; and second means for concomitantly varying said first and second light beams for maintaining said first means in said one of said first and second states.

19. The optical memory device of claim 18 wherein said first means comprises a quantum well having first and second optical absorption levels representative of said first and second states, respectively.

20. An optical latch device comprising:

a semiconductor quantum well region having optical absorption;

means responsive to first and second light beams having optical power for electrically controlling said optical absorption of said semiconductor quantum well region, said optical absorption having a first predetermined level when a ratio of the power of said first relative to said second light beam is greater than a first predetermined value, a second predetermined level when said ratio is less than a second predetermined value, and either of said first and second levels when said ratio is between said first and second values;

means for concomitantly varying the power of said first and second light beams for maintaining the level of said optical absorption of said semiconductor quantum well region prior to concomitantly varying the power of said first and second light beams.

* * * * *

REEXAMINATION CERTIFICATE (4052nd)

United States Patent
[19]

Hinton et al.

[11] B1 4,751,378

[45] Certificate Issued Apr. 25, 2000

[54] OPTICAL DEVICE WITH QUANTUM WELL ABSORPTION

[75] Inventors: Harvard S. Hinton, Naperville; Anthony L. Lentine, St. Charles, both of Ill.; David A. B. Miller, Fairhaven, N.J.

[73] Assignees: Bell Telephone Laboratories, Incorporated, Murray Hill, N.J.; American Telephone and Telegraph Company, New York, N.Y.

Reexamination Request:
No. 90/005,177, Dec. 3, 1998

Reexamination Certificate for:
Patent No.: 4,751,378
Issued: Jun. 14, 1988
Appl. No.: 07/042,202
Filed: Apr. 24, 1987

[51] Int. Cl.[7] .............................. H01J 40/14; G11C 11/42
[52] U.S. Cl. ..................................... 250/214 LS; 377/102
[58] Field of Search ...................... 250/214 LS, 214 LA, 250/214 R, 551; 377/102; 365/115, 114, 112, 110, 109, 106, 120, 121, 122, 215, 189.01, 222; 257/21, 15, 14

[56] References Cited

U.S. PATENT DOCUMENTS

| | | | |
|---|---|---|---|
| 3,860,915 | 1/1975 | Geier et al. | 365/110 |
| 4,716,449 | 12/1987 | Miller | 257/21 |
| 4,754,132 | 6/1988 | Hinton et al. | 250/214 LS |
| 4,789,964 | 12/1988 | Krilic | 365/115 |

*Primary Examiner*—John R. Lee

[57] ABSTRACT

An optically bistable device 100 is disclosed having a self electro-optic effect device (SEED) 104 and a variable optical attenuator 103 for maintaining the state of the SEED over a wide power range of two input light beams. The SEED is responsive to the relative power levels of the two input light beams for assuming one of two states. The state of the SEED is determined by the transmission level of one of the beams passing through quantum well region 102 of the device. The variable optical attenuator concomitantly varies the power level of the two input beams to maintain the present state of the SEED over a wide range of input light beam powers. When operated in a bistable operating region of the device, a control light beam with a low power level changes the device from one state to another. Two threshold values of a ratio of power between the two input beams establish where the device switches from one state to the other.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–20 is confirmed.

\* \* \* \* \*